(12) United States Patent
Gohman et al.

(10) Patent No.: US 7,384,154 B2
(45) Date of Patent: Jun. 10, 2008

(54) TEMPERATURE CONTROL SYSTEM AND METHOD FOR PROJECTION DEVICE LENSES

(75) Inventors: Jeffrey A. Gohman, Hillsboro, OR (US); Don Rhodes, Lake Oswego, OR (US)

(73) Assignee: InFocus Corporation, Wilsonville, OR (US)

( * ) Notice: Subject to any disclaimer, the term of this patent is extended or adjusted under 35 U.S.C. 154(b) by 310 days.

(21) Appl. No.: 11/077,981

(22) Filed: Mar. 10, 2005

(65) Prior Publication Data

US 2006/0203362 A1    Sep. 14, 2006

(51) Int. Cl.
G03B 21/18   (2006.01)
G03B 21/20   (2006.01)
G03B 21/22   (2006.01)
G03B 21/26   (2006.01)
G03B 21/28   (2006.01)

(52) U.S. Cl. ............................ 353/57; 353/77; 353/78; 353/101; 353/102

(58) Field of Classification Search ............... 353/52, 353/57, 58, 66, 70, 77–79, 98, 119, 102, 101; 248/447; 359/456, 457, 872; 356/334; 355/52, 355/55; 352/140, 202; 362/294
See application file for complete search history.

(56) References Cited

U.S. PATENT DOCUMENTS

| 4,778,264 | A  | * | 10/1988 | Matsumura et al. | ........ | 359/649 |
| 5,442,484 | A  |   | 8/1995  | Shikawa | ..................... | 359/651 |
| 5,739,905 | A  | * | 4/1998  | Hutchinson | .................. | 356/319 |
| 5,877,843 | A  | * | 3/1999  | Takagi et al. | .................. | 355/30 |
| 6,406,150 | B1 |   | 6/2002  | Burstyn | ........................ | 353/69 |
| 6,896,375 | B2 | * | 5/2005  | Peterson et al. | .............. | 353/66 |
| 7,080,910 | B2 | * | 7/2006  | Engle | .......................... | 353/119 |
| 2006/0114437 | A1 | * | 6/2006 | Akhssay et al. | .............. | 355/55 |

OTHER PUBLICATIONS

InFocus "ScreenPlay 7200 Product Support" webpage. URL: http://www.infocus.com/service/sp7200/specifications.asp?site_lang=1&site_region=1&.
InFocus "ScreenPlay 7205 Product Support" webpage. URL: http://www.infocus.com/service/sp7205/specifications.asp?site_lang=1&site_region=1&.

* cited by examiner

*Primary Examiner*—Melissa Jan Koval
(74) *Attorney, Agent, or Firm*—Alleman Hall McCoy Russell & Tuttle, LLP

(57) ABSTRACT

A temperature control system and method for projection device lenses. The temperature control system includes a controllable heater for selectively heating one or more lenses pad a controller for adjusting heat from the heat source responsive to an operating condition.

34 Claims, 7 Drawing Sheets

TEMPERATURE CONTROL SYSTEM AND METHOD FOR PROJECTION DEVICE LENSES

FIELD OF THE INVENTION

The present invention relates generally to projection lens systems, and more specifically to systems for controlling lens temperature.

DETAILED DESCRIPTION

Various types of devices may use lenses, such as front projectors, rear projectors, or other projection devices. However, in some devices, such as front projectors, the lens may be sensitive to temperature. This sensitivity to temperature may affect the focus of the lens, for example, which may degrade image quality. To overcome such issues, front projectors may provide the user with the ability to manually adjust focus, thereby compensating for temperature variations, such as during the projector warmup phase.

However, the inventors herein have recognized that rear projection lens systems may also be sensitive to temperature changes. This may be especially prevalent when compound lens systems are used where one or more lenses create distortion that is later canceled by other lenses, such as wide angle lenses. However, rear projection lens systems typically are closed, such that the user may have only limited access to the projection lens, thereby reducing the potential effectiveness of manual focusing (although it may be used, if desired).

Therefore, in one approach, a rear projection lens system may be used in which a heat source is operatively coupled to the lens system. The heat source may be configured to direct heat at least to a lens in the lens system, and a controller may be used to adjust heat from the heat source in response to an operating condition. This may provide temperature control and reduce temperature variation effects on the lens system.

While open loop heater controls may also be used in one example embodiment, in some case such controls do not provide accurate enough temperature control across the variety of operational conditions experienced in rear projection systems. In such cases, it may be possible to use feedback from a temperature sensor operatively associated with the lens system to control lens temperature, and thus improve focus and image quality.

Note that such an approach may enable operation without requiring glass elements that have a refractive index change which is opposite to that of other elements in the lens system. Such glass may contain lead, and thus may have limited use, although, it may be used if desired.

In one embodiment, a display device incorporating an optical system capable of producing a large image within a short distance may be used with the heater and/or temperature controls described herein, as described below. In the following description, for purposes of explanation, numerous specific details are set forth in order to provide a thorough understanding of the invention. It will be apparent, however, to one skilled in the art that these specific details may not be required. In other instances, structures and devices are shown in block diagram form.

Figure 1:
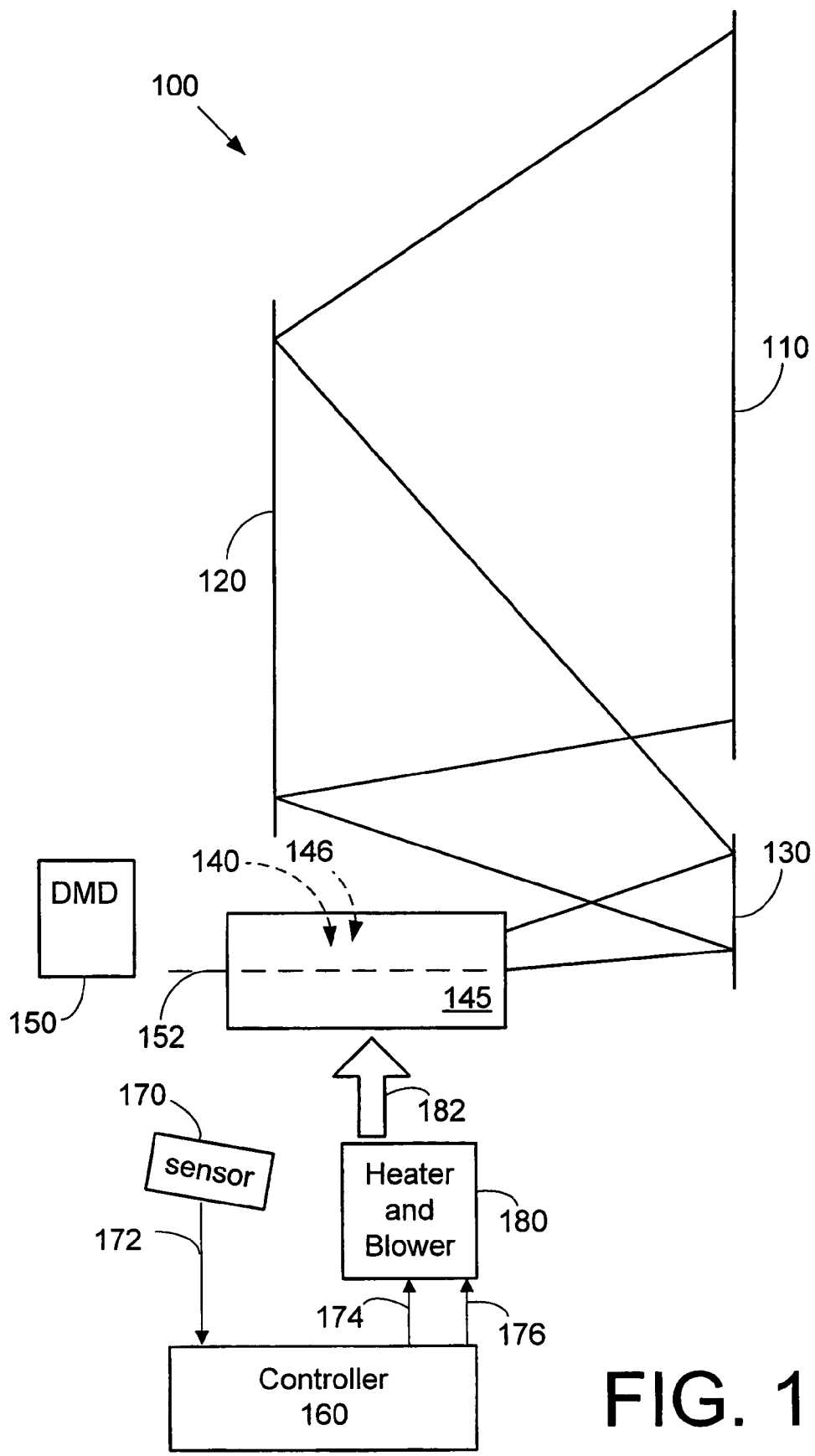
FIG. 1 illustrates one embodiment of a rear projection display device with planar mirrors parallel to a screen and lens temperature control.

FIG. 1 shows a rear projection display device including planar mirrors that are arranged in parallel with a screen. As described in greater detail below, use of planar mirrors parallel to the screen and an optical system as described herein having an optic axis (152) that is perpendicular to the mirrors and the screen may allow the rear projection display device to be thinner and simpler than other rear projection display devices. For example, an ultra-thin rear projection display device as described herein that is less than 7 inches thick can provide a 60-inch image.

In one embodiment, rear projection display device 100 includes screen 110, back plate mirror 120, intermediate mirror 130, optical system 145 and digital micromirror device (DMD) 150. Other components known in the art are not illustrated for reasons of simplicity of description. An image can be provided to DMD 150 in any manner known in the art. DMD 150 selectively reflects light from a light source (not shown in FIG. 1) to optical system 145. Display device 100 may be any type of display device known in the art. Any suitable device (e.g., microelectromechanical systems (MEMS), grating light valve (GLV), liquid crystal display (LCD), liquid crystal on silicon (LCOS)) can be used to provide an image to optical system 145.

In one embodiment, DMD 150 is offset from the optic axis of optical system 145 such that only a portion (e.g., 50%, 60%, 40%) of the available lens field is used. By offsetting DMD 150 with respect to the optic axis of optical system 145, the image from DMD 150 is projected by optical system 145 in the upper portion of the lens field to intermediate mirror 130. Alternatively, a lower portion of the lens field can be used to project an image to intermediate mirror 130. In such an embodiment, optical system 145 would be above intermediate mirror 130, which would be above back plate mirror 120.

Optical system 145 is typically configured to produce a predistorted image that compensates for down-stream distortion generated by the various relay mechanisms in the projection device. The optical system may be suitable for use in a number of projection-based display devices including, but not limited to, rear-projection systems, front-projection systems, capture devices, etc.

Optical system 145 may include one or more sub-systems, which may include one or more lenses, prisms, or other optical elements. For example, according to one embodiment, the optical system may include a wide-angle projection system and a predistortion system. When operating as a projection device, the predistortion system presents a predistorted intermediate image to the wide-angle projection system, which then projects the image for display i.e. to intermediate mirror 130. The wide-angle projection system typically includes a wide-angle lens. The predistortion system may take the form of one or more optical elements or combination of elements, including, but not limited to, a relay lens stage, fiber optic bundles, curved mirror(s), prism(s), etc. Moreover, some components of the optical system may be interchangeable. For example, the optical system may be adapted to receive various different wide-angle lens stages to allow for changes in focal length or magnification. Accordingly, appropriate optical system components could be utilized based on user-selected options.

For purposes of the present description, the term "distortion," is intended to mean any change from the initial image applied to the predistortion system. For example, in some embodiments, a distortion in the image includes an alteration in the shape of at least a portion of the image. The term "predistortion" is intended to mean an intentional distortion of an optical image that compensates for (i.e. is substantially equal and opposite to) distortion generated by the wide-angle projection system. It will be appreciated that the predistorted image may be presented in a variety of different configurations depending on the type of downstream distortion for which the predistorted image is intended to compensate.

According to one embodiment, optical system 145 may incorporate a lens system 140, which may be a wide-angle lens system 146. In one embodiment, wide-angle lens system 146 may have a field angle of 152°, 120°, 160° or more; however, other lenses can be used. In general, the wider the angle of wide-angle lens system 146, the thinner display device 100 can be made. A suitable wide-angle lens system is described in greater detail below.

Intermediate mirror 130, which may be optional, reflects the image to back plate mirror 120, which reflects the image to screen 110, which can be, for example, a Fresnel lens. Back plate mirror 120 is also a planar mirror and is parallel to screen 110 and perpendicular to the optic axis of lens system 140. Because the optic axis of lens system 140 is perpendicular to intermediate mirror 130 and both intermediate mirror 130 and back plate mirror 120 are planar and parallel to screen 110, the distortion caused by angled lenses and aspherical mirrors is absent in display device 100. This may simplify the design of display device 100 and reduce the cost and complexity of manufacturing.

FIG. 1 also shown a heater system having an electronic controller 160, which may be a computer having computer readable storage medium encoded therein for performing various acts, such as those described herein. The controller may include any type of microprocessor, such as a digital microprocessor capable of reading signals, performing calculations, and sending control and/or actuation signals. In this example, controller 160 is shown receiving a temperature signal 172 from temperature sensor 170. While a single temperature sensor is shown, more sensors may be used if desired. In such an example, the temperature readings may be combined in various ways, such as averaging, to obtain a composite temperature measurement. Alternatively, multiple control actuators may be used to control different portions or lenses at different temperatures as sensed by different temperature sensors. Further, sensor 170 may be positioned near or adjacent optical system 145, or positioned to obtain a temperature reading of a particular system, subsystem, or lens.

Continuing with FIG. 1, controller 160 is also shown sending a first control signal 174 and a second control signal 176 to blower/heater device 180. blower may also include a blower motor which receives the command signal from controller 160. While FIG. 1 shows blower/heater device 180 as a combined unit, a separate blower and heater device may be used, with one signal sent from the controller to each device. Alternatively, only a heater or only a blower may be used, if desired. Further still, multiple heaters and/or multiple blowers may be used to obtain independent control of various positional subsections, lenses, or sections of optical system 145. For example, a first blower/heater may be used to control temperature in a first area of the system, and a second blower/heater may be used to control temperature in a second area of the system. In this way, independent temperature control may be obtained, if desired, to obtain proper focus and image quality.

As shown in FIG. 1, blower/heater 180 blows heated air 182 toward optical system 145 to transfer heat to lenses or lens systems contained therein. In addition, the controller can control the blower (with the heater off, for example) to blow un-heated air to the system to transfer heat away from the system and reduce temperature, if desired.

Figure 2:
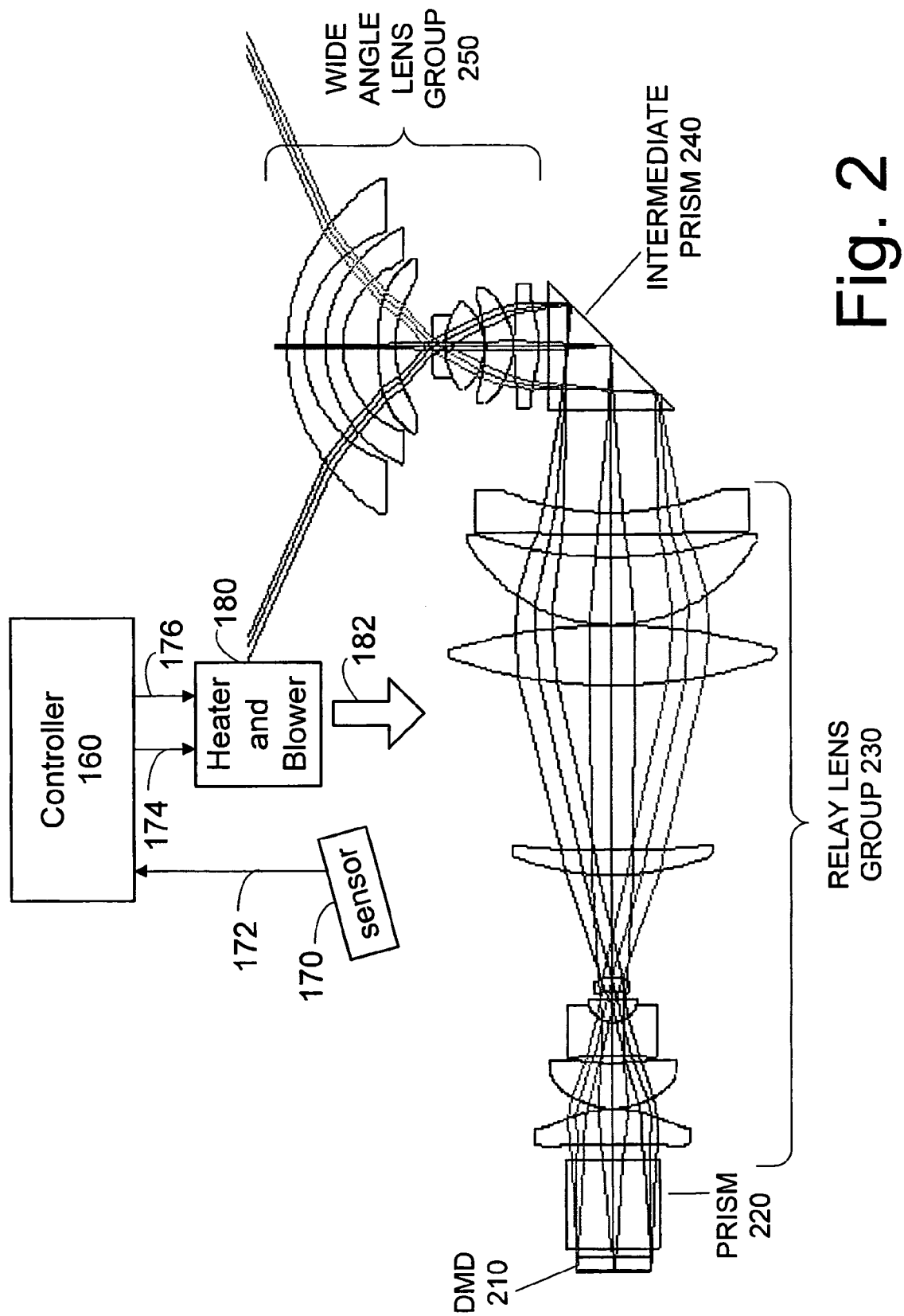
FIG. 2 illustrates one embodiment of a folded optical system.

FIG. 2 illustrates an embodiment of a folded optical system. DMD 210 provides an image to the optical system. As described above, other types of devices can be used to provide an image to the optical system. Prism 220 directs the image to relay lens group 230. Relay lens group 230 projects the image from prism 220 to intermediate prism 240 and distorts the image such that intermediate prism 240 receives an intentionally distorted intermediate image (i.e a predistorted image).

In one embodiment, relay lens group 230 includes 9 lenses; however, any number of lenses can be used based on, for example, the desired distortion of the intermediate image, or the overall size of the lens system. The predistortion caused by relay lens group 230 is substantially equal and opposite the distortion caused by wide angle lens group 250. In one embodiment, the predistorted image is approximately a half circle image in a warped image plane. In alternate embodiments, other predistorted images can be used. For example, if the full lens field is used, the predistorted image would be a generally circular image. The image plane may or may not be warped.

Intermediate prism 240 provides a 90° fold or turn in the image path. As described below with respect to FIG. 3, the fold is not required. Alternatively, other fold angles, for example, 45°, 30°, 135°, 180°, etc. could be used. Wide-angle lens group 250 projects the image received from intermediate prism 240 to a screen (not shown in FIG. 2) for display. Because wide-angle lens group 250 causes distortion to the image to be projected and the intermediate image has been predistorted by relay lens group 230, the resulting image projected by the lens system has little or no distortion. In one embodiment, the total perceived distortion caused by relay lens group 230, wide-angle lens group 250 and any associated prisms is less than 3%.

Wide-angle lens group provides a field angle of greater than 100°. In one embodiment the field angle is 153°; however, any angle can be provided. Moreover, multiple, interchangeable, wide-angle lens groups allowing for various focal lengths or magnification may be used.

In one embodiment, the optic axes of the lenses of relay lens group 230 are aligned. Similarly, the optic axes of the lenses of wide-angle lens group 250 are also aligned. In one embodiment, the optical axis of wide-angle lens group 250 is perpendicular to the screen so that keystone, or trapezoidal, distortion is absent.

FIG. 2 also shows an exemplary heater system similar to that of FIG. 1, although any heater system described herein may be used. In the example of FIG. 2, the heater directs heat toward the lenses in relay lens group 230. However, the heat may be directed to any of the lenses, or only to particular lenses, if desired. Likewise, FIG. 2 shows temperature sensor 170 primarily measuring lens temperatures in the relay group. However, sensor 170 may be repositioned to various locations, such as to wide angle lens group 250, if desired. Further, as noted above, multiple sensors, heater, blower, or combinations thereof may be used.

Figure 3:
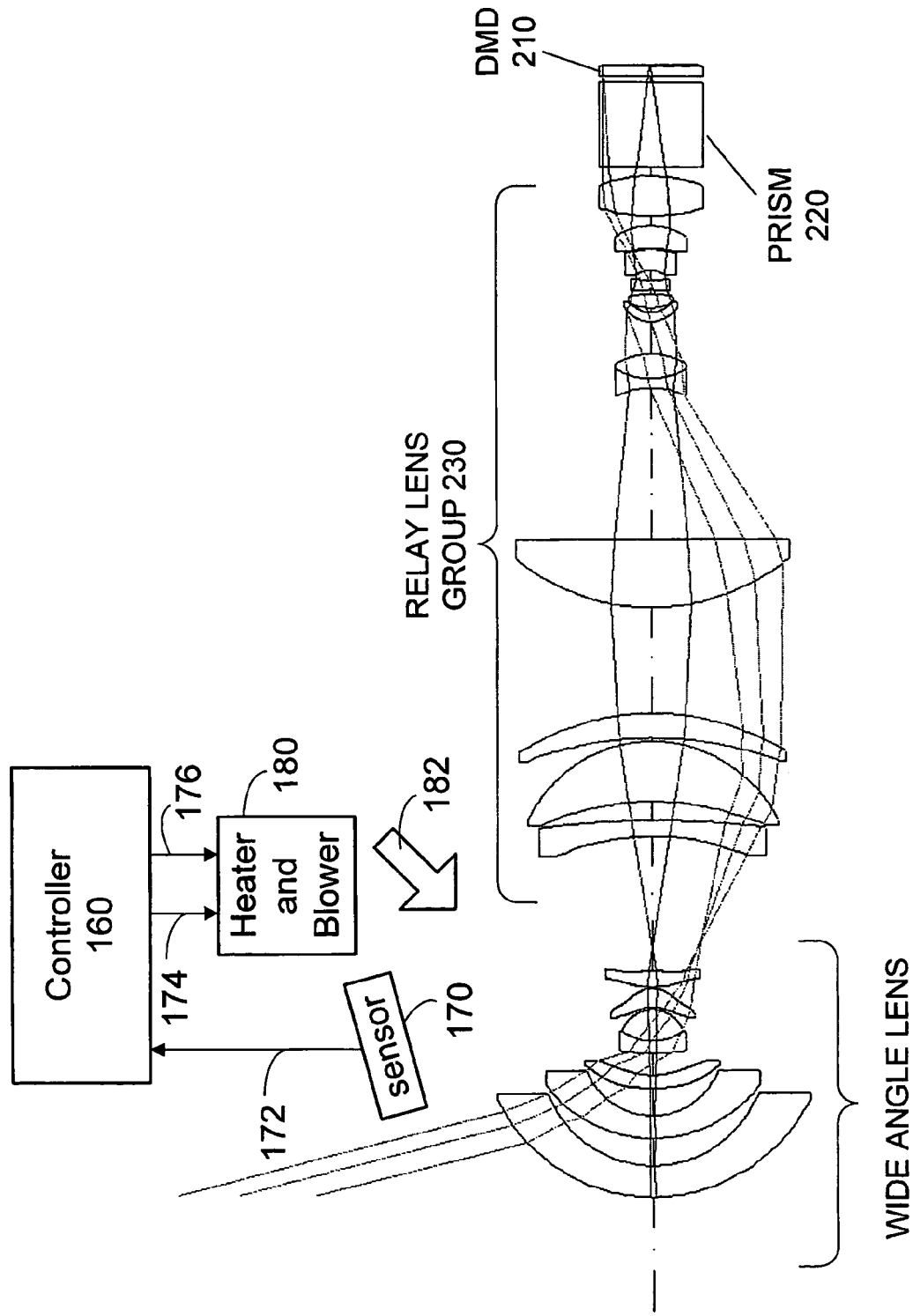
FIG. 3 illustrates another embodiment of an optical system with lens temperature control.

FIG. 3 illustrates another embodiment of an optical system. The optical system of FIG. 3 is similar to the optical system of FIG. 2 except that the optical system of FIG. 3 is not folded. That is, wide-angle lens system 250 is co-axial with relay lens group 230. The lens system of FIG. 3 does not include an intermediate prism, though one may be used, if desired.

In one embodiment, the optical system of FIG. 3 has the following prescription:

| Surface | RDY | THI | RMD GLA |
|---|---|---|---|
| 1: | 46.74531 | 4.000000 | NBF1_HOYA |
| 2: | 28.81163 | 5.051213 | |
| 3: | 30.58292 | 4.000000 | NBFD10_HOYA |
| 4: | 21.01576 | 8.441106 | |
| 5: | 129.13928 | 4.000000 | SLAM60_OHARA |
| | | | ASP: |

K: 0.000000
IC: YES          CUF: 0.000000
A: 0.664982E−04  B: −.187975E−06   C: 0.420794E−09
D: −.348519E−12

| 6: | 21.14941 | 8.859193 | |
|---|---|---|---|
| | | ASP: | |

K: 0.000000
IC: YES          CUF: 0.000000
A: −.367450E−04  B: 0.130594E−06   C: −.665374E−09
D: 0.794813E−12

| 7: | 78.00018 | 3.124861 | FDS90_HOYA |
|---|---|---|---|
| 8: | 16.67079 | 9.473114 | BACD16_HOYA |
| 9: | −13.03245 | 0.200000 | |
| 10: | −17.74399 | 6.650512 | MNBF1_HOYA |
| | | ASP: | |

K: 0.000000
IC: YES          CUF: 0.000000
A: 0.314557E−03  B: −.254460E−05   C: 0.149709E−07
D: −.573297E−10

| 11: | −14.40905 | 0.200000 | |
|---|---|---|---|
| | | ASP: | |

K: 0.000000
IC: YES          CUF: 0.000000
A: −.440469E−04  B: 0.237538E−05   C: −.134637E−07
D: 0.222969E−10

| 12: | 131.97096 | 6.000000 | MNBF1_HOYA |
|---|---|---|---|
| | | ASP: | |

K: 0.000000
IC: YES          CUF: 0.000000
A: 0.711368E−04  B: −.624364E−06   C: 0.210000E−08
D: −.350000E−11

| 13: | −15.59413 | 2.000000 | |
|---|---|---|---|
| | | ASP: | |

K: 0.000000
IC: YES          CUF: 0.000000
A: 0.257396E−03  B: −.884746E−06   C: 0.186450E−08
D: 0.216077E−11

| 14: | INFINITY | 30.000000 | FD60_HOYA |
|---|---|---|---|
| 15: | INFINITY | 24.565488 | |
| 16: | −64.35637 | 4.999034 | FD60_HOYA |
| 17: | −1966.99974 | 5.494742 | |
| 18: | −96.81620 | 16.104081 | NBFD13_HOYA |
| 19: | −39.51766 | 0.200000 | |
| 20: | 136.11245 | 14.269098 | LAC8_HOYA |
| 21: | −114.50422 | 39.301091 | |
| 22: | −250.53752 | 5.915028 | BACD16_HOYA |
| 23: | −62.97973 | 24.296450 | |
| STO: | 8.12022 | 3.000000 | FDS90_HOYA |
| 25: | 7.27512 | 2.000000 | |
| 26: | −67.85690 | 5.522870 | BACD16_HOYA |
| 27: | −5.88750 | 7.902370 | FDS90_HOYA |

-continued

| | | | |
|---|---|---|---|
| 28: | 135.96725 | 1.688647 | |
| 29: | −35.98083 | 10.637917 | MNBF1_HOYA |
| | | ASP: | |

K: 0.000000
IC: YES          CUF: 0.000000
A: 0.956626E−04  B: 0.298084E−06   C: −.100781E−07
D: 0.371253E−10

| 30: | −16.84259 | 0.200000 | |
|---|---|---|---|
| | | ASP: | |

K: 0.000000
IC: YES          CUF: 0.000000
A: 0.434637E−04  B: 0.131005E−06   C: −.120433E−08
D: 0.718134E−12

| 31: | 29.02346 | 8.028674 | SLAH60_OHARA |
|---|---|---|---|
| | | ASP: | |

K: 0.000000
IC: YES          CUF: 0.000000
A: 0.696210E−05  B: −.847612E−07   C: 0.104328E−09
D: −.182720E−12

| 32: | 186.81664 | 4.000000 | |
|---|---|---|---|
| | | ASP: | |

K: 0.000000
IC: YES          CUF: 0.000000
A: −.196461E−05  B: 0.343490E−07   C: −.146991E−09
D: 0.000000E+00

| 33: | INFINITY | 21.000000 | BSC7_HOYA |
|---|---|---|---|
| 34: | INFINITY | 2.000000 | |
| 35: | INFINITY | 3.000000 | FC5_HOYA |
| 36: | INFINITY | 0.440000 | |

In the above prescription, surfaces 1-13 correspond to wide-angle lens group 250 and surfaces 16-32 correspond to relay lens group 230. In alternate embodiments, other prescriptions and/or other materials can also be used.

FIG. 3 also shows an exemplary heater system similar to that of FIG. 1, although any heater system described herein may be used. In FIG. 3, the heater system is directed primarily to controlling temperature of lenses in the wide any lens group 250. However, as noted above and below, various alternatives may be used, if desired.

Figure 4:
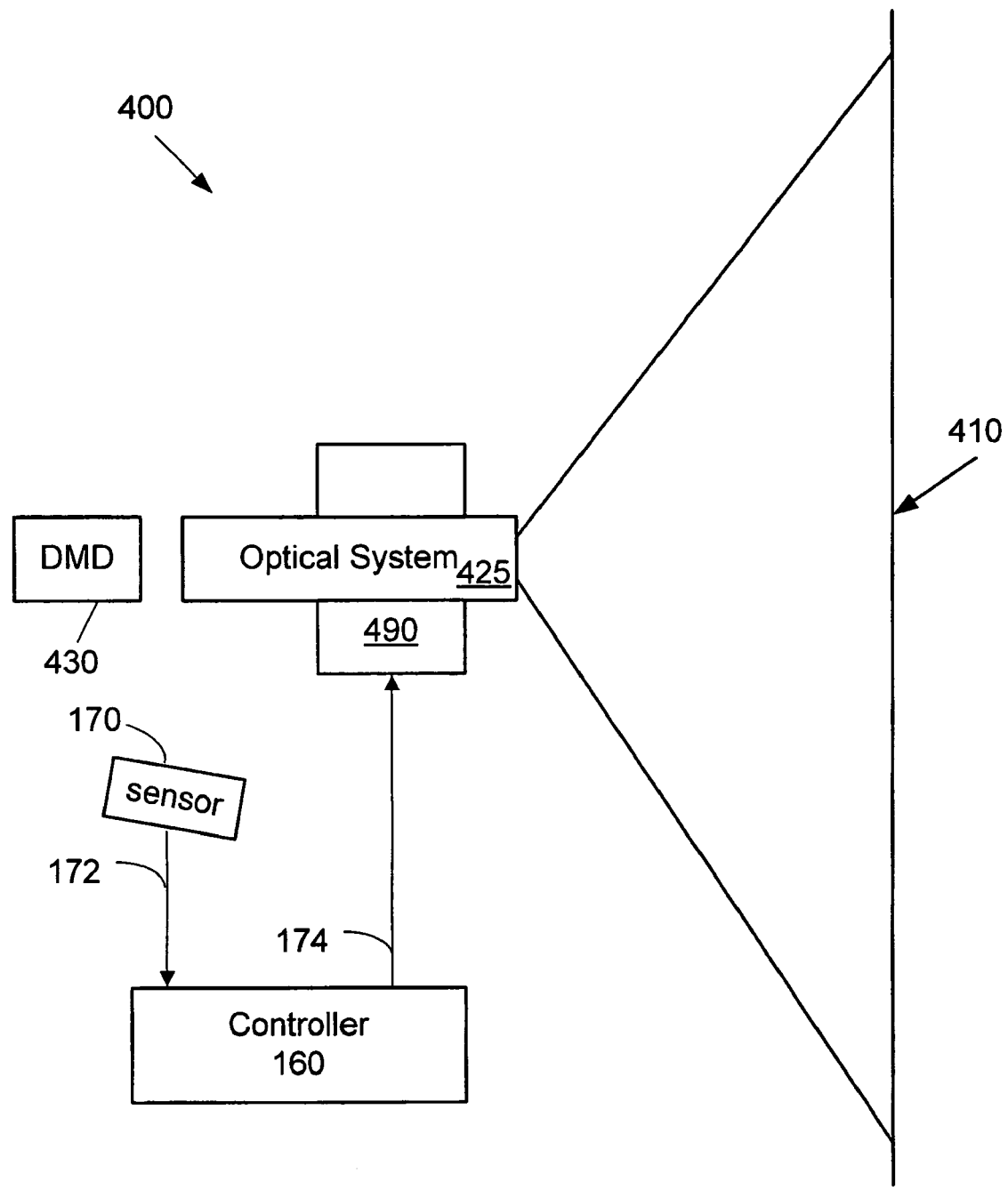
FIG. 4 illustrates one embodiment of a rear projection display device with an optical system and lens temperature control.

FIG. 4 illustrates yet another embodiment of a rear projection display device having an optical system 425. Display device 400 includes screen 410, optical system 425 and DMD 430. According to this embodiment, optical system 425 projects an image directly onto screen 410. Screen 410 may be any object that diffuses light. For example, screen 410 may be a Fresnel lens described above.

An image is generated by optical engine components (not shown in FIG. 4) that are known in the art and directed to optical system 425 via DMD 430. In alternate embodiments, DMD 430 can be replaced by other components, for example, microelectromechanical systems (MEMS), grating light valves (GLV), liquid crystal display (LCD), liquid crystal on silicon (LCOS), etc. The optic axis of DMD 430 is aligned with the optic axis of optical system 425, so that the full lens field is used to project the image to screen 410.

As with the optical systems described above, optical system 425 may include both a wide-angle projection system and a predistortion system configured to compensate for any distortion created by the wide-angle projection system.

While the heater/blower system of FIG. 1 may be used in the system of FIG. 4, an alternative embodiment is shown with a wrap-around heater coil 490. Likewise, the wrap-around heater coil may be used in the system of FIG. 1, or in any of the other embodiments, if desired.

Figure 5:
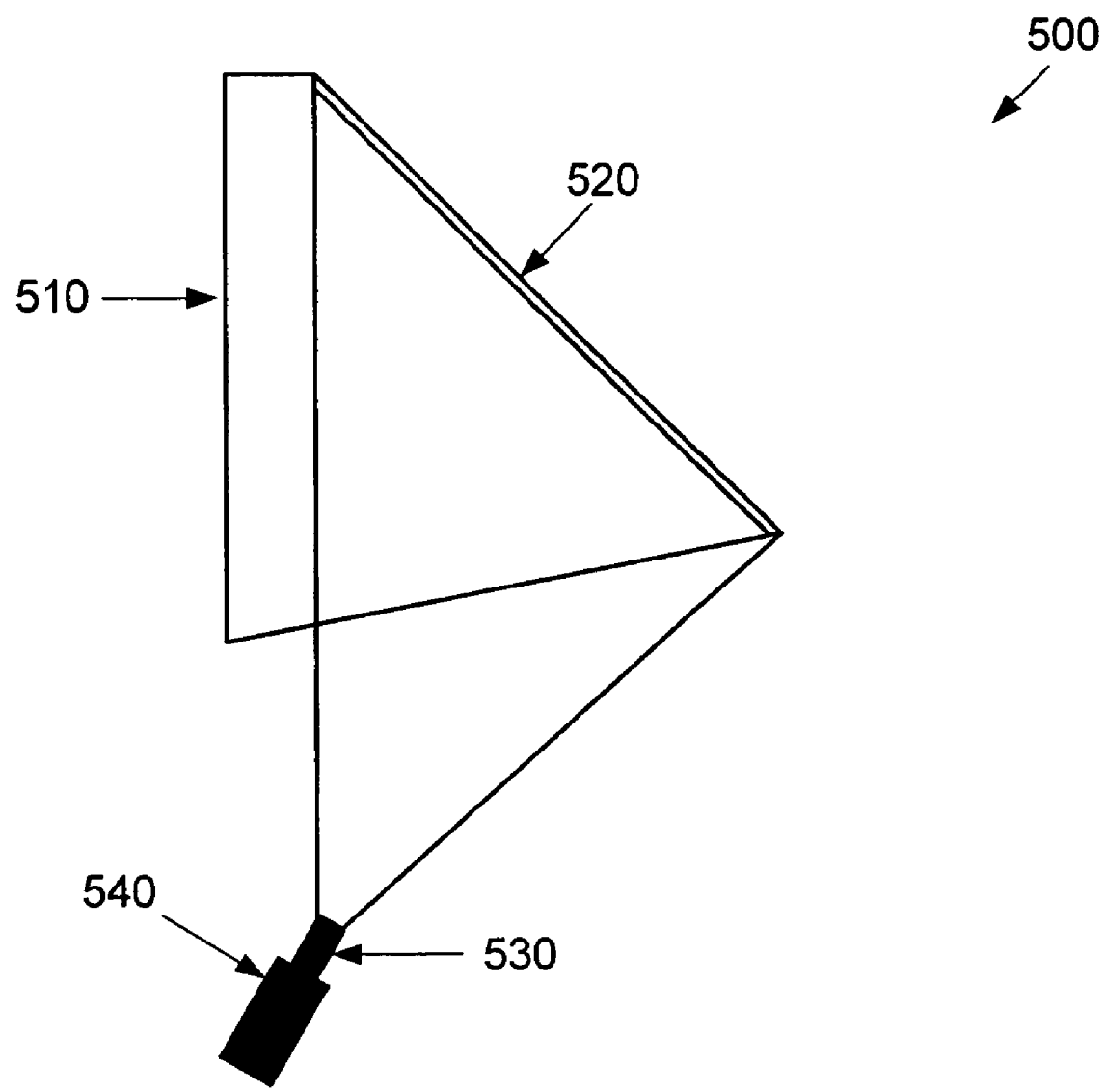
FIGS. 5-6 illustrate alternative rear projection display devices.

Referring now to FIG. 5, another example rear projection device configuration is shown that may be used with the lens and heater controls described herein. In general, display device 500 includes optical engine 540, projection lens 530, back plate mirror 520 and screen 510. Optical engine 540 generates an image to be projected on screen 510. Projection lens 530 projects the image from optical engine 540 on to back plate mirror 520, which then reflects the image to screen 510. The size of display device 500 may be proportional to the size of the image to be displayed on screen 510. Thus, for large screen sizes (e.g., >60 inches), the overall size of display device 500 can be very large.

Figure 6:
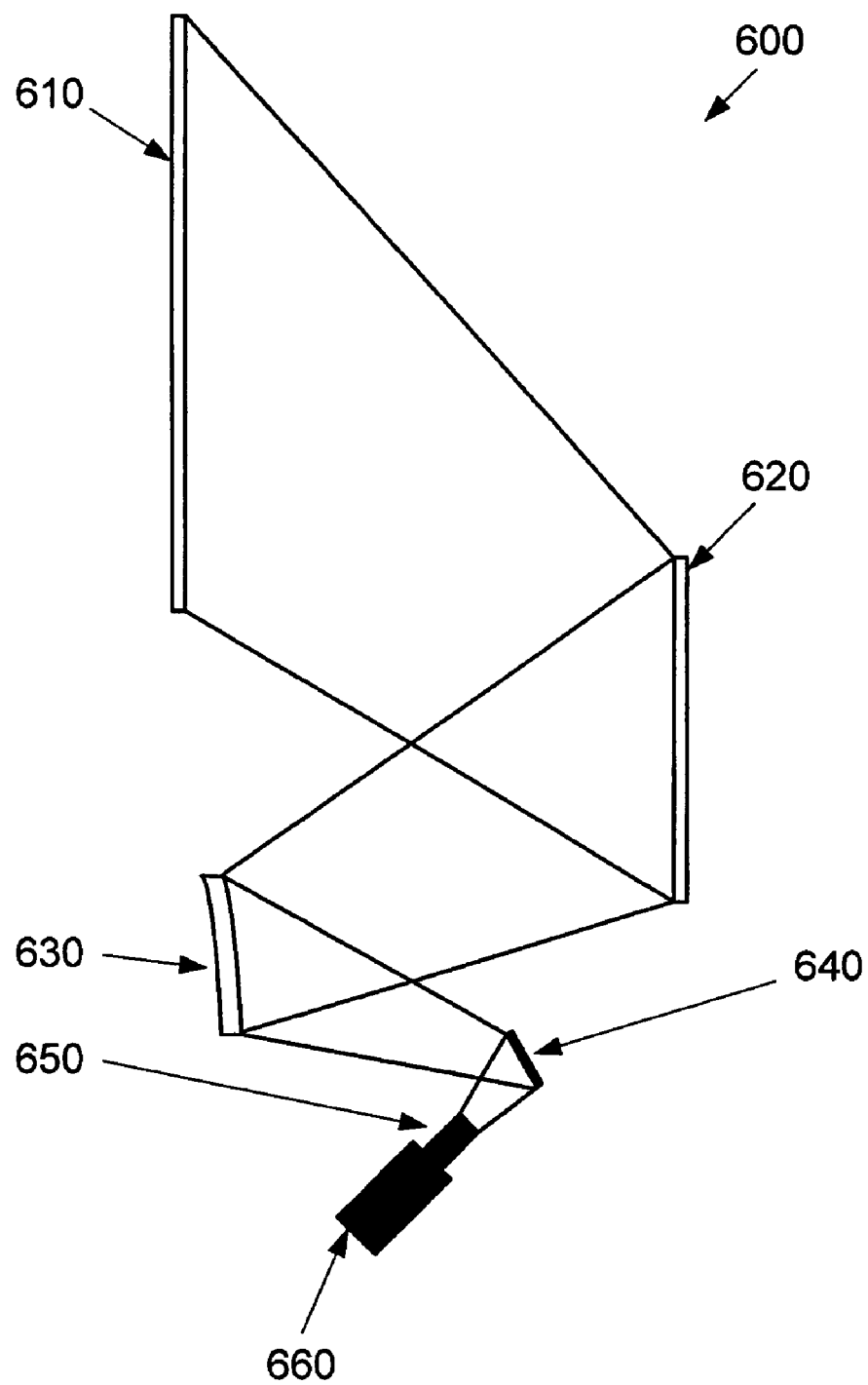

Other types of thin rear projection display devices that may be used with the lens and/or heater controls described herein are rear projection display devices including an aspherical mirror. FIG. 6 illustrates an exemplary thin rear projection display device with an aspherical mirror. An image from optical engine 660 is projected on reflective mirror 640 by projection lens 650. Reflective mirror 640 reflects the image to aspherical mirror 630, which magnifies the projected image and extends the field ray angle. Aspherical mirror 630 reflects the image to back plate mirror 620, which then reflects the image to screen 610. While rear projection display device 600 may provide a thinner package for the same size screen as compared to display device 100 of FIG. 1, the manufacturing and alignment issues associated with use of aspherical mirror 630 may increase the cost of display device 600.

As shown in FIG. 6, a closed-loop temperature control system 670 may be employed to control the temperature of aspherical mirror 630. Control system 670 may be similar to the embodiments of FIGS. 1-3, such that it may include a sensor (not shown) that senses temperature of the aspherical mirror and produces a temperature signal 172. Control system 670 may further include a heater and/or blower, similar to previous embodiments, that are responsive to temperature signal 172 to heat or cool the mirror, as desired, for example by applying heated air to the mirror or cooling the mirror with unheated air directed by the blower. Alternatively, control system 670 may include a wrap-around heater coil, similar to the embodiment of FIG. 4, or other device that applies heat other than by directing heated air to the mirror. As in the previous embodiments, a controller may be employed to receive sensed temperature data and appropriately actuate the heating and/or cooling of the mirror based on operating conditions and/or to maintain a desired temperature set-point.

Figure 7:
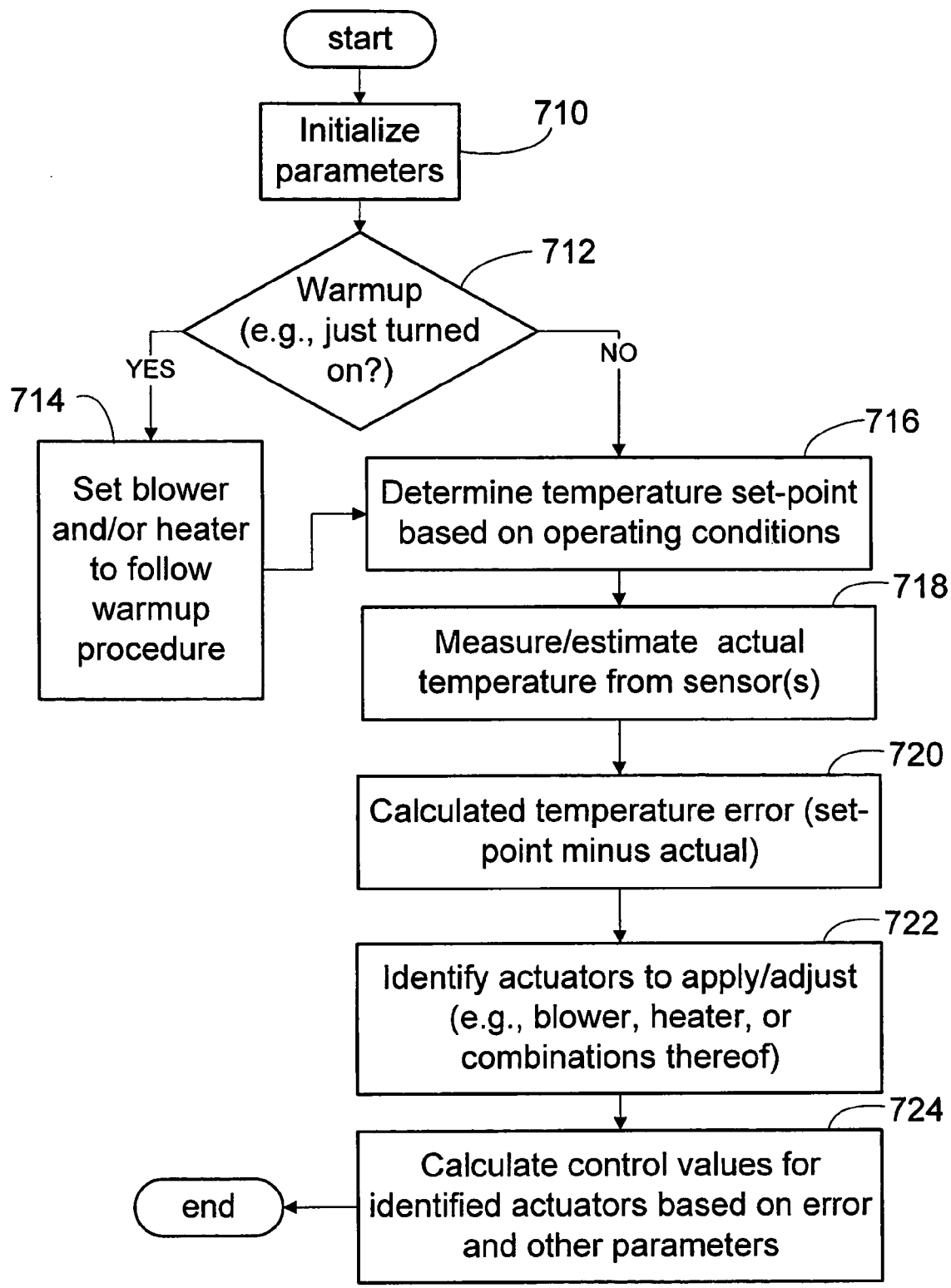
FIG. 7 is a high-level flow chart of a routine for controlling lens temperature.

Referring now to FIG. 7, an example routine is described for controlling temperature of a lens system in a rear projection device to reduce loss of focus.

First, in step 710, operating parameters of the projection device and/or its subsystems are initialized. At step 712, it is determined whether a warmup procedure needs to be followed, for example if the projection device has just been turned on. After completion of the warmup procedure, the method may include, at step 716, determining a desired temperature set-point depending on the operating conditions. Alternatively, after warmup, parameters may be re-initialzed at step 710 or other acts may be performed to determine and/or establish the operating conditions, which, as indicated at 716, may be used to determine the temperature set-point for one or more lenses of the projection device.

As shown at 718, the method may further include measuring or estimating temperature conditions (e.g., of a lens), based upon data from the sensor or sensors employed in the system. In closed-loop systems, such as those described herein, the method may also include, at step 720, determining an error, or difference, between the sensed temperature, and the desired set-point temperature. The method may further include, at step 722, identifying the actuators to apply or adjust in order to correct the sensed differential. For example, one or blowers may be identified for actuation, in order to cool off a particular lens in the system. Similarly, one or more heaters may be identified if low temperature conditions are sensed. At step 724, the method may further include calculating control values for the identified actuators, based on the temperature error calculated at step 720 and/or other factors or parameters. The control values may then be applied to the desired actuator to achieve the desired heating or cooling effect.

Although many of the examples discussed herein are rear projection systems, it should be appreciated that the closed-loop temperature control systems discussed herein may be employed to control lens temperature in front projection systems, and/or in other types of projection systems employing lenses.

Furthermore, although the present disclosure includes specific embodiments, specific embodiments are not to be considered in a limiting sense, because numerous variations are possible. The subject matter of the present disclosure includes all novel and nonobvious combinations and sub-combinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A system, comprising:
 a projection lens system having at least one lens;
 a heat source operatively coupled to said projection lens system, said heat source including a blower configured to force heat at least to said at least one lens; and
 a controller configured to adjust said heat from said heat source in response to at least an operating condition.

2. The system of claim 1 wherein said at least one lens comprises plastic.

3. The system of claim 1 wherein said at least one lens has substantially no lead.

4. The system of claim 1 wherein said heat source includes a heating element wrapped around said at least one lens.

5. The system of claim 4 wherein said heating element is substantially adjacent said at least one lens.

6. The system of claim 1 wherein said heat source includes a heating element positioned substantially separately from said at least one lens.

7. The system of claim 1 further comprising a fan or a blower.

8. The system of claim 1 further comprising a sensor, and wherein said controller is responsive to said sensor.

9. The system of claim 8 wherein said sensor is a temperature sensor.

10. The system of claim 9 wherein said controller adjusts said heat source based on said temperature sensor to control temperature of said at least one lens.

11. The system of claim 1, wherein said projection lens system is a rear projection lens system.

12. A system, comprising:
a lens system having a predistortion lens system to create a predistorted image from an original image and a projection lens system configured to substantially cancel distortion in the predistorted image and thereby project a substantially non-distorted image corresponding to the original image, where the projection lens system includes a wide-angle lens;
a heat source operatively coupled to said rear projection lens system, said heat source configured to direct heat to at least one lens of the lens system; and
a controller configured to adjust said heat from said heat source in response to at least an operating condition.

13. The system of claim 12 wherein said at least one lens comprises plastic.

14. The system of claim 12 wherein said at least one lens has substantially no lead.

15. The system of claim 12 wherein said heat source includes a heating element wrapped around said at least one lens.

16. The system of claim 15 wherein said heating element is substantially adjacent said at least one lens.

17. The system of claim 12 wherein said heat source includes a heating element positioned substantially separately from said at least one lens.

18. The system of claim 12 further comprising a fan or a blower.

19. The system of claim 12 further comprising a sensor, and wherein said controller is responsive to said sensor.

20. The system of claim 19 wherein said sensor is a temperature sensor.

21. The system of claim 12 wherein said lens system is a rear projection lens system.

22. A system, comprising:
a rear projection lens system having an optical system configured to create a predistorted image which, when projected by a wide-angle lens, becomes a substantially non-distorted image, said rear projection lens system comprising a plurality of lenses aligned along an optic axis;
a heat source operatively coupled to said rear projection lens system, said heat source configured to direct heat at least to one of said plurality of lenses;
a sensor positioned relative to one of said plurality of lenses;
a controller configured to receive a signal from said sensor, and to adjust said heat from said heat source in response to at least said signal during at least one operating condition.

23. The system of claim 22 wherein said controller is further configured to adjust said heat independent of said signal during at least a second operating condition.

24. The system of claim 22 wherein said rear projection lens system includes a fold.

25. The system of claim 22 wherein said rear projection tens system includes a wide angle lens.

26. A system, comprising:
a rear projection lens system having at least one lens;
a heater means for controlling temperature of at least one lens in said lens system;
a sensor operatively coupled to said rear projection lens system; and
a controller configured to adjust said heat from said heat source in response to at least said sensor.

27. A method for controlling temperature of a projection lens system having at least one lens, comprising:
measuring temperature from a sensor operatively coupled to the projection lens system;
determining a desired lens temperature based on an operating condition; and
adjusting a heat source operatively coupled to the projection lens system, said heat source including a blower configured to force heat at the lens.

28. A system, comprising:
a projection system having at least one mirror;
a closed-loop temperature control system operatively coupled to said at least one mirror, the closed-loop temperature control system including:
a heat source operatively coupled to said at least one mirror, said heat source configured to direct heat at least to said at least one mirror;
a sensor operatively coupled to said at least one mirror; and
a controller configured to adjust said heat from said heat source in response to at least said sensor.

29. The system of claim 28, where the mirror is an aspherical mirror.

30. The system of claim 29, where the aspherical mirror is plastic.

31. The system of claim 29, where the aspherical mirror is glass.

32. The system of claim 28, where the mirror is an aspherical mirror, and where the projection system is a rear projection system.

33. The system of claim 32, where the aspherical mirror is plastic.

34. The system of claim 32, where the aspherical mirror is glass.

* * * * *